(12) United States Patent
Hessling et al.

(10) Patent No.: US 7,606,657 B2
(45) Date of Patent: Oct. 20, 2009

(54) DEVICE AND METHOD FOR DETECTING AND PREPROCESSING VEHICLE, TRAFFIC AND/OR DRIVER RELATED DATA

(75) Inventors: Matthias Hessling, Hildesheim (DE); Bernd Petzold, Wunstorf (DE); Cornelius Hahlweg, Hildesheim (DE); Gerd Draeger, Braunschweig (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 10/203,068

(22) PCT Filed: Feb. 3, 2001

(86) PCT No.: PCT/DE01/00420

§ 371 (c)(1),
(2), (4) Date: Nov. 4, 2002

(87) PCT Pub. No.: WO01/57826

PCT Pub. Date: Aug. 9, 2001

(65) Prior Publication Data

US 2003/0137407 A1   Jul. 24, 2003

(30) Foreign Application Priority Data

Feb. 4, 2000   (DE) ................... 100 04 968

(51) Int. Cl.
*G01C 21/00* (2006.01)

(52) U.S. Cl. ............... 701/201; 701/23; 701/25; 701/202; 340/995.12; 342/357.09

(58) Field of Classification Search .......... 701/201, 701/202, 206, 208, 25, 200, 23; 340/995.1, 340/995.12; 73/178 R; 342/46, 357.09
See application file for complete search history.

(56) References Cited

U.S. PATENT DOCUMENTS 5,189,612 A * 2/1993 Lemercier et al. ........... 701/23

(Continued)

FOREIGN PATENT DOCUMENTS

DE   197 00 353   7/1998

(Continued)

OTHER PUBLICATIONS

Implementation of a Modular Mobile Mapping in a Geocomputing Platform for Location-Based Services Using Geographic RecognitionJin-Suk Kang; Younghee You; Mee Young Sung; Engineering of Computer Based Systems, 2008. ECBS 2008. 15th Annual IEEE International Conference and Workshop on the,Mar. 31, 2008-Apr. 4, 2008 pp. 149-158.*

(Continued)

*Primary Examiner*—Cuong H Nguyen
(74) *Attorney, Agent, or Firm*—Kenyon & Kenyon LLP

(57) ABSTRACT

A device and a method of detecting and preprocessing vehicle data, traffic data, and/or driver data, such as the speed, direction of travel, engine condition, weather conditions, heart rate, etc., is described, in which the time and location of recording the data are also recorded in addition to the data mentioned. The position determination may be accomplished in particular by a positioning system such as GPS. The position may be adjusted using a digital map. The recorded data is preferably preprocessed in real time, coded, and/or compressed and/or subjected to a statistical analysis, linked mathematically/logically and recorded and/or transmitted.

12 Claims, 2 Drawing Sheets

U.S. PATENT DOCUMENTS

| | | | | |
|---|---|---|---|---|
| 5,369,588 | A * | 11/1994 | Hayami et al. | 340/995.19 |
| 5,523,950 | A * | 6/1996 | Peterson | 455/456.5 |
| 5,602,739 | A * | 2/1997 | Haagenstad et al. | 701/117 |
| 5,610,821 | A * | 3/1997 | Gazis et al. | 455/456.5 |
| 5,845,227 | A * | 12/1998 | Peterson | 701/209 |
| 5,919,239 | A | 7/1999 | Fraker et al. | |
| 5,933,100 | A * | 8/1999 | Golding | 340/995.13 |
| 5,955,973 | A * | 9/1999 | Anderson | 340/988 |
| 5,987,381 | A * | 11/1999 | Oshizawa | 701/209 |
| 6,100,806 | A * | 8/2000 | Gaukel | 340/573.4 |
| 6,202,024 | B1 * | 3/2001 | Yokoyama et al. | 701/207 |
| 6,252,544 | B1 * | 6/2001 | Hoffberg | 342/357.1 |
| 6,263,276 | B1 * | 7/2001 | Yokoyama et al. | 701/207 |
| 6,411,891 | B1 * | 6/2002 | Jones | 701/201 |
| 6,591,188 | B1 * | 7/2003 | Ohler | 701/209 |
| 6,615,130 | B2 * | 9/2003 | Myr | 701/117 |
| 6,628,233 | B2 * | 9/2003 | Knockeart et al. | 342/357.1 |
| 6,657,558 | B2 * | 12/2003 | Horita et al. | 340/995.13 |
| 6,791,472 | B1 * | 9/2004 | Hoffberg | 340/905 |
| 6,812,851 | B1 * | 11/2004 | Dukach et al. | 340/815.4 |
| 2001/0029425 | A1 * | 10/2001 | Myr | 701/117 |
| 2002/0082767 | A1 * | 6/2002 | Mintz | 701/117 |
| 2003/0014180 | A1 * | 1/2003 | Myr | 701/117 |
| 2003/0134648 | A1 * | 7/2003 | Reed et al. | 455/456 |
| 2003/0146854 | A1 * | 8/2003 | Jones | 340/988 |
| 2003/0195696 | A1 * | 10/2003 | Jones | 701/201 |
| 2003/0195697 | A1 * | 10/2003 | Jones | 701/201 |
| 2003/0195699 | A1 * | 10/2003 | Jones | 701/201 |
| 2003/0233188 | A1 * | 12/2003 | Jones | 701/200 |
| 2003/0233190 | A1 * | 12/2003 | Jones | 701/207 |
| 2004/0064245 | A1 * | 4/2004 | Knockeart et al. | 701/117 |
| 2004/0066330 | A1 * | 4/2004 | Knockeart et al. | 342/357.07 |

FOREIGN PATENT DOCUMENTS

| | | | |
|---|---|---|---|
| DE | 1912859 A1 * | 3/1999 | |
| EP | 0 715 287 | 6/1996 | |
| JP | 10-092217 | * | 3/1998 |
| WO | 96 22202 | 7/1996 | |

OTHER PUBLICATIONS

Geometric travel planning; Edelkamp, S.; Jabbar, S.; Willhalm, T.; Intelligent Transportation Systems, 2003. Proceedings. 2003 IEEE; vol. 2, Oct. 12-15, 2003 pp. 964-969 vol. 2.*

Evaluation of performance of Beijing expressway based on integrated GPS/GIS data; Ling Huang; Jianping Wu; Intelligent Transportation Systems Conference, 2006. ITSC '06. IEEE; Sep. 17-20, 2006 pp. 927-932; Digital Object Identifier 10.1109/ITSC.2006.1706863.*

Wearable, wireless brain computer interfaces in augmented reality environments; Navarro, K.F.; Information Technology: Coding and Computing, 2004. Proceedings. ITCC 2004. International Conference on; vol. 2, 2004 pp. 643-647 vol. 2 Digital Object Identifier 10.1109/ITCC.2004.1286726.*

Discovering regular groups of mobile objects using incremental clustering; Elnekave, S.; Last, M.; Maimon, 0.; Ben-Shimol, Y.; Einsiedler, H.; Friedman, M.; Siebert, M.; Positioning, Navigation and Communication, 2008. WPNC 2008. 5th Workshop on Mar. 27-27, 2008 pp. 197-205; Digital Object Identifier 10.1109/WPNC.2008.4510375.*

* cited by examiner

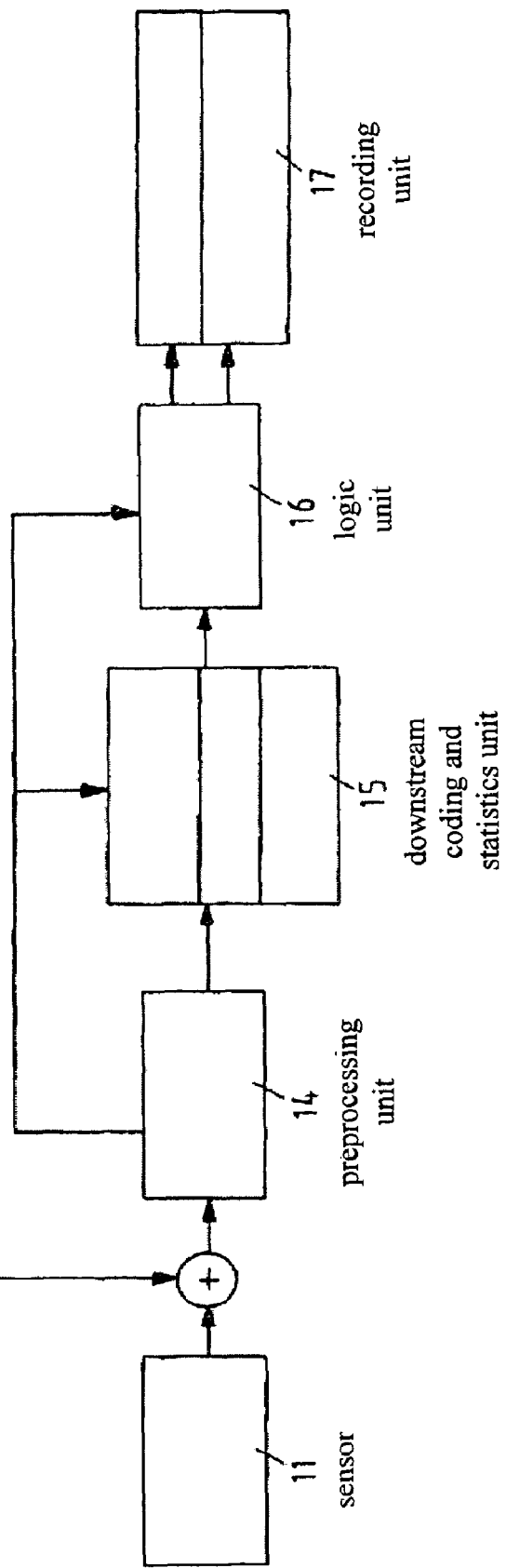

DEVICE AND METHOD FOR DETECTING AND PREPROCESSING VEHICLE, TRAFFIC AND/OR DRIVER RELATED DATA

FIELD OF THE INVENTION

The present invention relates to a method of detecting and preprocessing vehicle data, traffic data and/or driver data, in which data pertaining to the vehicle, the traffic situation, and the driver is compiled during a trip, preprocessed and made available for further analysis, as well as a device for implementing such a method.

BACKGROUND INFORMATION

Methods of data acquisition and data processing in a vehicle are conventional. Data acquisition methods may be used, for example, to prepare warnings for the driver of a vehicle. With such systems, variables derived from several original variables can also be generated. However, there may be known methods in which the data is recorded as a function of time and location and this information is taken into account in processing the data. However, it has become increasingly important to acquire the greatest possible number of relevant variables, i.e., those appearing to be relevant, and the changes in such variables in order to thereby be able to compile more extensive statistics regarding individual driving performance as a function of environmental and vehicular states and/or changes therein. However, recording all variables for possible subsequent analysis may result in enormous volumes of data, even in the case of rough time discretization, thus compromising both the efficacy of storage as well as the efficacy of the subsequent analysis.

SUMMARY OF THE INVENTION

An object of the present invention is to make available a method and a device for acquisition and preprocessing of vehicle data, traffic data and/or driver data, so that all data relevant for an analysis of driving performance may be compiled without generating unreasonably large volumes of data.

In the method, the time and location of data acquisition are also compiled along with the data pertaining to the vehicle, the traffic situation, and the driver. In this way it is possible to correlate the data pertaining to the vehicle, the traffic situation, or the driver with a specific point in time and a specific location on the trip route, which permits a differentiated analysis of the data, including data reduction by derivation of variables of interest and by determination of correlations. Due to the unique correlation between time and location, it is also possible to exchange time and location as the underlying variables and thereby reduce the volume of data to be recorded.

Data processing may preferably be performed by developing long-term statistics, short-term statistics and/or by data compression. In short-term statistics, a set of integral parameters that are variable over time is recorded using data reduction. An example of this is recording the velocity or acceleration of a vehicle as a function of time and/or location. In the case of long-term statistics, certain data sets may be updated constantly by true integration without any interest in the time characteristic in detail. Examples of such variables include the filling levels of fuel, windshield wiper fluid, oil, and the like. It is also possible to record the actual curve of numerous variables through suitable compression methods, which are loss-free under some circumstances. Methods of data compression are conventional and make use of the fact that a data stream determined by measurement generally has regularities (e.g., constancy) which allow compressed storage of the data.

Furthermore, it is possible through suitable mathematical and/or logic links between different data to obtain derived variables, which may be the object of actual interest. After determining these variables, the original data on which they are based may then be deleted, under some circumstances yielding considerable savings in storage space. One example of a derived variable is the risk of slippery ice, which is derived from linking the outside temperatures with wheel slip.

The detection and processing of data may be performed and may be preferably based on a given person, i.e., in particular the driver of the vehicle. To this end, the driver is to be identified so that the data thus recorded may be assigned to that driver. With person-specific processing, individual behavior patterns in driving may be determined. These behavior patterns may then be used in other systems such as navigation systems to adapt them on a user-specific basis.

In addition, the data thus compiled is advantageously correlated with a digital map. A direct database reference to the objects contained in the map may be provided. For example, the speed and absolute and/or relative frequency with which a driver drives on certain sections of road or different types of road (highway, interstate, freeway, etc.) may be noted in the digital map. It is also conceivable for biometric data of the driver to be correlated with sections of road or types of roads in order to ascertain which of these constitute a stress situation for the driver. There is in turn advantageously a link between data acquisition and a navigation system so that the information thus obtained may be made accessible to the navigation system for intelligent route planning.

The present invention also concerns a device for detecting and preprocessing vehicle data, traffic data, and/or driver data, containing sensors for sampling data based on the vehicle, the traffic situation, and/or the driver, as well as processing units and memory units for the recorded data. This device may include a clock and a position sensor for recording the time and location simultaneously with the aforementioned data. With this device, it is possible to implement the method described above with the advantage of an efficient and relevant determination of the driver's performance. A positioning system such as GPS (Global Positioning System) is suitable as the position sensor; GPS allows vehicle data and traffic data related to the absolute geographic location to be recorded (geographic coordinates with the corresponding inaccuracy). When the device is equipped with an autonomous navigation system (having its own digital map), it is possible to refine the position determination, i.e., make it more specific to the extent that it is possible to acquire the data with an increased accuracy with respect to the exact map position.

This device may in an exemplary embodiment be provided as part of an automobile. However, it is not limited to this application and it may also detect different types of traffic behavior. For example, people may use this device to compile their own route statistics and route data recording in public transit. Similarly, operators of local mass transit may use such a device to obtain data regarding capacity utilization and control of traffic facilities. In addition, this device may also be used independently of persons, e.g., in tracking parcels and generating integrated statistics.

BRIEF DESCRIPTION OF THE DRAWING

The FIG. 1 shows a block diagram of an exemplary method according to the present invention.

FIG. 2 shows an exemplary design of the device of the present invention.

DETAILED DESCRIPTION

Figure 1:
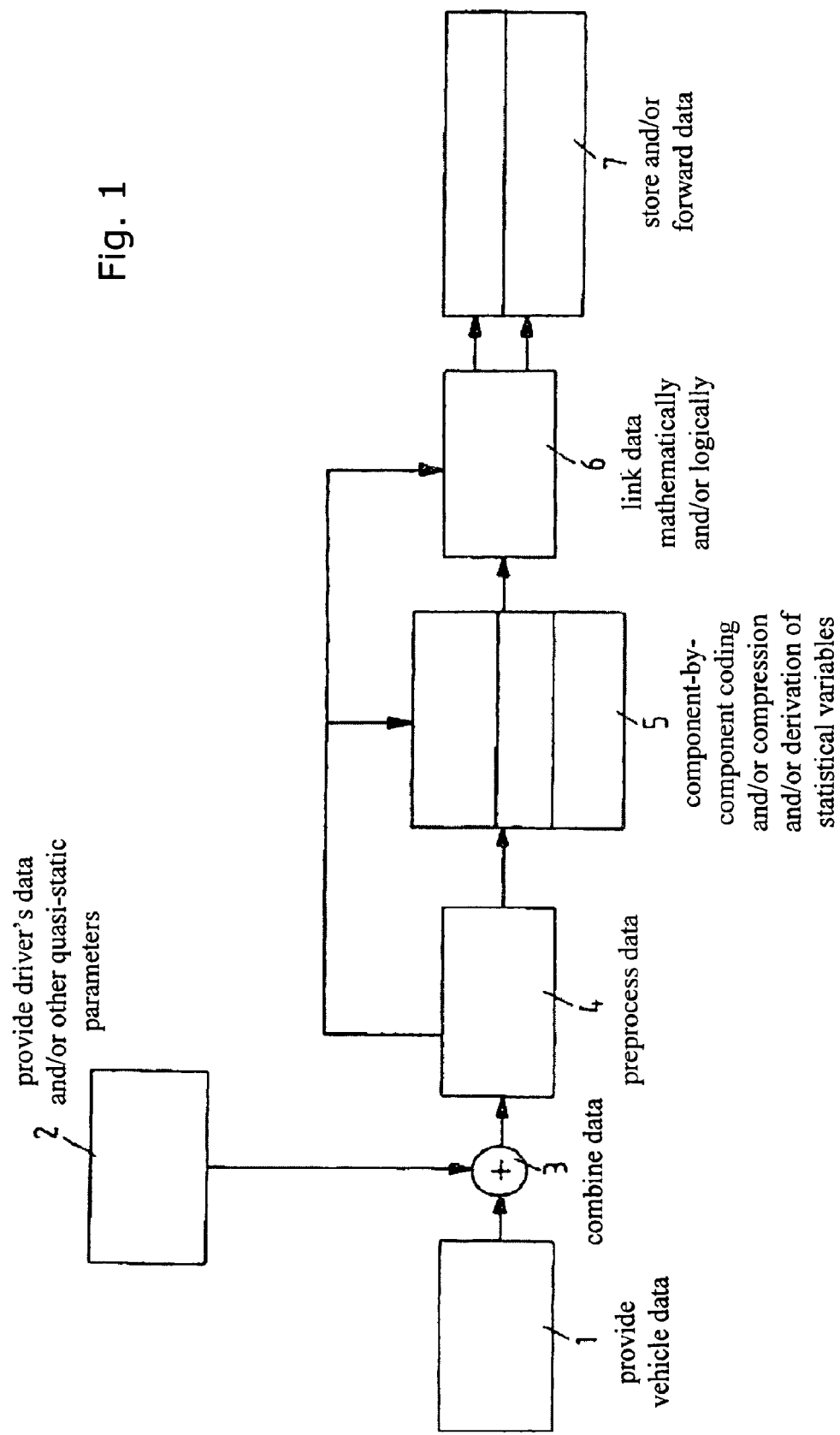

The signal flows in a device according to the present invention, which may be situated in an automobile, are represented by arrows in the figures. The data thus transferred is multi-component data, i.e., of a vectorial nature. As shown in FIG. 1, the vehicle data of interest is made available via vehicle sensors from block element 1. This data includes in particular the time and a location determination, which may be provided with the help of a GPS system with reference to a digital map.

From the block labeled as 2, the driver's data and/or other quasi-static parameters are added to and combined with the vehicle data in summation element 3. This results in a continuous, mixed analog-digital data stream, which is subsequently sent for realtime preprocessing 4. This data is compiled over a period of time, i.e., the point in time of its determination is recorded and retained together with the data. The following data may be considered in particular for acquisition in tracking an automobile:

map position, i.e., geographic coordinates;

distance traveled (absolute value, kilometer reading);

elevation above sea level;

speed of the vehicle;

acceleration of the vehicle;

direction of travel;

engine rotational speed;

engine data, such as temperature, operating readiness, warning states;

transmission shifting states;

turning a corner;

switch states of windshield wipers, lights, flashing lights, hazard lights;

emergency deployment of the airbag;

antilock brake system, traction control;

instantaneous fuel consumption;

filling levels of fuel, windshield wiper fluid, oil, brake fluid and service fluids;

noise levels, etc.

Environmental data that is recordable includes in particular the temperature, atmospheric humidity, brightness, weather conditions, and the like. Biodata on the driver and/or passengers of the vehicles may include heart rate, respiration, temperature, eye activity, etc. In addition, the driver, passengers of the vehicle, and/or the vehicle may be identified and unambiguously correlated with the measured data.

As shown in FIG. 2, complete digitization of the incoming data from sensor 11 and driver's module 12 may be performed in unit 14 for real time preprocessing (block element 4 in FIG. 1). Depending on the change in incoming variables over time, as well as external data supplied on the part of driver's module 12, the sampling rate may also be established in unit 14, i.e., the sampling frequency for the data to be compiled. In addition, separate parameters are output in vector form and used to control the downstream coding and statistics unit 15 and logic unit 16.

Unit 15 receives the completely digitized data from preprocessing unit 4 and accepts its component-by-component coding and/or compression and/or derivation of statistical variables (short-term statistics/long-term statistics) (block element 5 in FIG. 1). The parameters of unit 15 are controlled by preprocessing unit 14 during processing.

Processing unit 15 transfers the processed data to logic unit 16, where the data is linked mathematically and/or logically (block element 6 in FIG. 1). New variables may be formed in this way. For example, the risk of slippery ice may be ascertained as the result of outdoor temperatures below 0° C. and a great wheel slip. It is of course also possible to simply pass the variables through in unit 16 if they are not to undergo any processing.

The variables made available by unit 16 finally go to recording unit 17, which assumes the function of storage and/or forwarding of the time-dependent variables as well as of the quasi-static integral variables (block element 7 in FIG. 1).

The parameters may be processed as variables in processing units 15 and 16. In particular the parameters of time resolution, statistics and coding may be designed as variables based on the person, the situation, and/or context and/or they may be controlled during a trip. The required controlled variables are obtained in preprocessing unit 14, where instantaneous driving data is analyzed in uncompressed and closely sampled form before being processed further and/or stored in real time.

By linking the data mathematically and logically in unit 16, it may be possible to determine variables which are derived during travel, i.e., in real time, and thus to reduce the data stream.

What is claimed is:

1. A device for recording and preprocessing data pertaining to a vehicle and a traffic situation for a further analysis, comprising:
   a plurality of sensors configured to record data during a vehicle trip;
   a clock configured to record a time of data recordation;
   a position sensor configured to record a location of data recordation;
   a preprocessing unit configured to preprocess the recorded data to obtain derived data and reduce the recorded data; and
   a processor configured to analyze the preprocessed recorded data and the derived data;
   wherein the device is configured to correlate at least one of the recorded data and the derived data with a digital map;
   wherein the plurality of sensors, the clock, the position sensor, the preprocessing unit, and the processor are arranged at the vehicle;
   wherein the device is configured to identify a specified occupant of the vehicle and uniquely assign the recorded data to the specified occupant of the vehicle.

2. The device as recited in claim 1, wherein the position sensor is a Global Positioning System (GPS).

3. The device as recited in claim 1, wherein a driving frequency is associated with a particular road section of the digital map and is displayed within the digital map.

4. A method of recording and preprocessing data, comprising:
   recording data pertaining to a vehicle and a traffic situation during a vehicle trip;
   identifying at least one specified occupant of the vehicle and recording biodata of the at least one specified occupant of the vehicle including at least one of a heart rate, respiration data, a temperature, and eye activity data as further data during the vehicle trip;

compiling locations of the data recording;

compiling times of the data recording;

preprocessing the recorded data to obtain derived data and reduce the recorded data;

providing the preprocessed recorded data and the derived data for further analysis;

wherein at least one of the recorded data and the derived data is correlated with a digital map;

wherein the recorded data is uniquely assigned to the identified at least one specified occupant of the vehicle.

5. The method as recited in claim 4, wherein the biodata includes a first biodata correlated with a driver and a second biodata correlated with a passenger.

6. A method of recording and processing data pertaining to a vehicle and a traffic situation, comprising:

recording the data during a vehicle trip;

compiling locations of the data recording;

compiling times of the data recording;

preprocessing the recorded data to obtain derived data and reduce the recorded data;

providing the preprocessed recorded data and the derived data for further analysis;

further processing the preprocessed recorded data and the derived data at least one of by deriving long-term statistics and by deriving short-term statistics;

wherein at least one of the recorded data and the derived data is correlated with a digital map; and wherein the recording, the compiling of locations, the compiling of times, the preprocessing, and the providing of the recorded data and the derived data are performed at the vehicle.

7. The method as recited in claim 6, further comprising compiling further data pertaining to a driver and preprocessing the further data to obtain further derived data, wherein one of the further data and the further derived data is correlated with the digital map.

8. The method as recited in claim 6, wherein the recorded data includes environmental data.

9. The method as recited in claim 8, wherein the environmental data includes at least one of a temperature, an atmospheric humidity, and a brightness.

10. A method of recording and preprocessing data pertaining to a vehicle and a traffic situation for a further analysis, comprising:

recording the data during a vehicle trip;

compiling locations of the data recording;

compiling times of the data recording;

preprocessing the recorded data to obtain derived data and reduce the recorded data;

providing the preprocessed recorded data and the derived data for further analysis;

wherein at least one of the recorded data and the derived data is correlated with a digital map;

wherein the recording, the compiling of locations, the compiling of times, the preprocessing, and the providing of the recorded data and the derived data are performed at the vehicle;

wherein the preprocessing enables a reduction in an amount of the data that has been recorded in the recording step; and wherein at least one specified occupant of the vehicle is identified and the recorded data is uniquely assigned to the specified occupant of the vehicle.

11. The method as recited in claim 10, wherein a driving pattern is determined for a particular person.

12. The method as recited in claim 10, wherein the identified at least one specified occupant of the vehicle is a driver of the vehicle, and the recorded data is uniquely assigned to the driver of the vehicle.

* * * * *

UNITED STATES PATENT AND TRADEMARK OFFICE
CERTIFICATE OF CORRECTION

PATENT NO. : 7,606,657 B2
APPLICATION NO. : 10/203068
DATED : October 20, 2009
INVENTOR(S) : Hessling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Twelfth Day of October, 2010

David J. Kappos
*Director of the United States Patent and Trademark Office*